United States Patent [19]

Schonert

[11] Patent Number: 4,544,038
[45] Date of Patent: Oct. 1, 1985

[54] ROTARY TILLER APPARATUS AND PIVOTAL SUPPORT STRUCTURE THEREFOR

[76] Inventor: Robert F. Schonert, Star Rte. #9, Bismarck, N. Dak. 58501

[21] Appl. No.: 458,343

[22] Filed: Jan. 17, 1983

[51] Int. Cl.$^4$ ............................................. A01B 65/02
[52] U.S. Cl. ..................................... 172/78; 172/99; 172/111
[58] Field of Search ................... 172/5, 6, 38, 98, 99, 172/111, 305, 477, 417, 447, 484, 742, 78; 30/379, 379.5; 56/10.4, 11.9

[56] References Cited

U.S. PATENT DOCUMENTS

| 2,694,355 | 11/1954 | Pertics et al. | 172/305 |
| 2,749,824 | 6/1956 | Friday | 172/38 X |
| 2,791,953 | 5/1957 | Erickson et al. | 172/98 |
| 2,815,048 | 12/1957 | Davis | 30/379 |
| 3,190,364 | 6/1965 | Maloney | 172/111 |
| 3,783,950 | 1/1974 | Geurts | 172/417 X |
| 4,102,403 | 7/1978 | Steinberg | 172/477 X |
| 4,183,195 | 1/1980 | James | 56/10.4 X |
| 4,384,618 | 5/1983 | Williams | 172/5 |
| 4,491,183 | 1/1985 | Anderson et al. | 172/5 |

FOREIGN PATENT DOCUMENTS

| 285895 | 3/1966 | Australia | 172/305 |
| 781183 | 3/1968 | Canada | 172/484 |
| 1384104 | 11/1964 | France | 172/38 |
| 900255 | 7/1962 | United Kingdom | 172/5 |

Primary Examiner—Richard T. Stouffer
Attorney, Agent, or Firm—Kinney & Lange

[57] ABSTRACT

A rotary tiller apparatus includes a main support frame having a first member that is pivotal in a generally vertical direction and a second member that is pivotally attached to the first member and pivots in a generally horizontal direction. The rotary tiller apparatus is pivotally mounted on a vehicle, such as a tractor for removing weeds and the like between plants planted in rows. A first hydraulic cylinder is provided to pivot the first support member in the generally vertical direction. The first hydraulic cylinder is attached to the first support member at one end and to the tractor at the other end. A second hydraulic cylinder is positioned to pivotally move the second support member with one end of the second hydraulic cylinder being attached to the second support member and the other end of the hydraulic cylinder being attached to the first support member. A rotary tiller having a plurality of tiller teeth attached to a rotatable disk is mounted on an end of the first support member along with a hydraulic motor for rotating the disk and teeth. The tiller is mounted on an end of the second support member opposite from the hydraulic cylinder. Suitable controls are provided on the tractor to control the first and second hydraulic cylinders and the hydraulic motor of the tiller.

6 Claims, 10 Drawing Figures

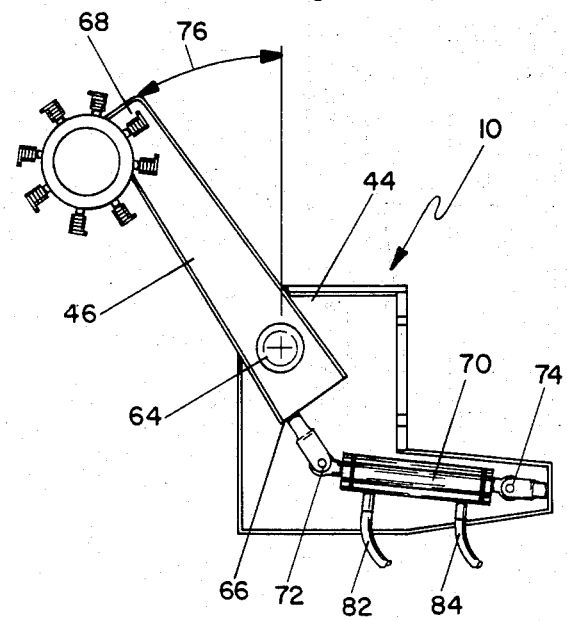
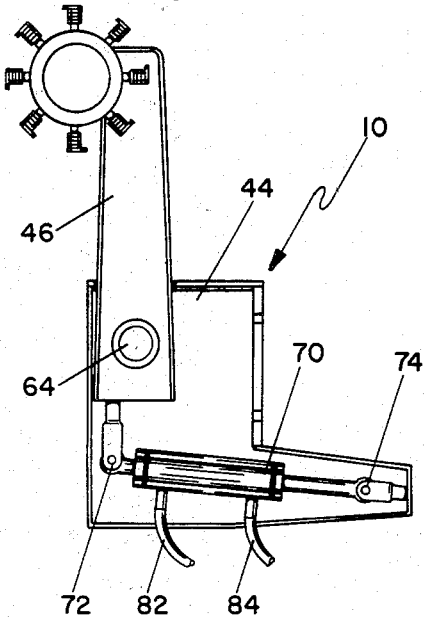
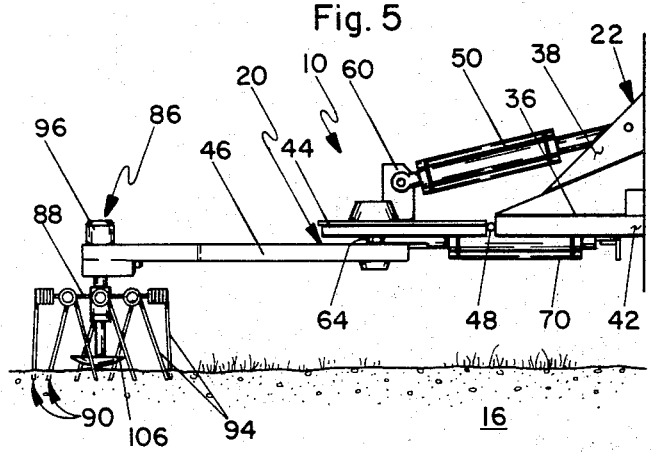
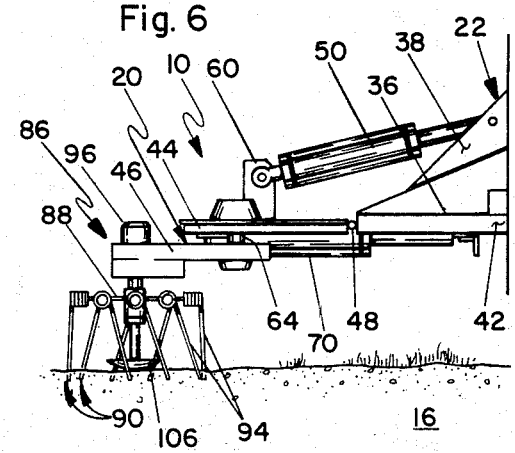
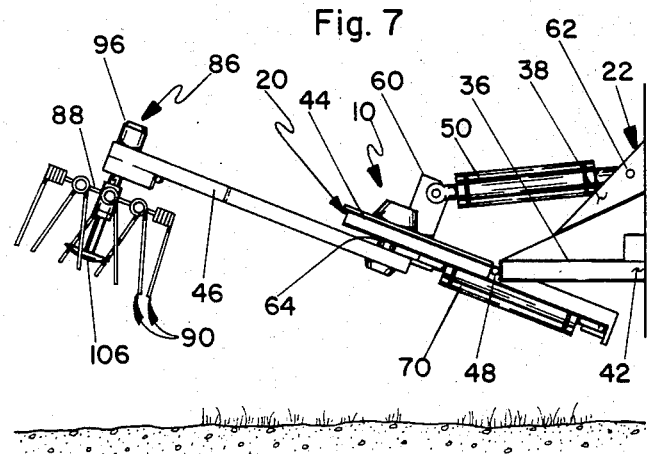
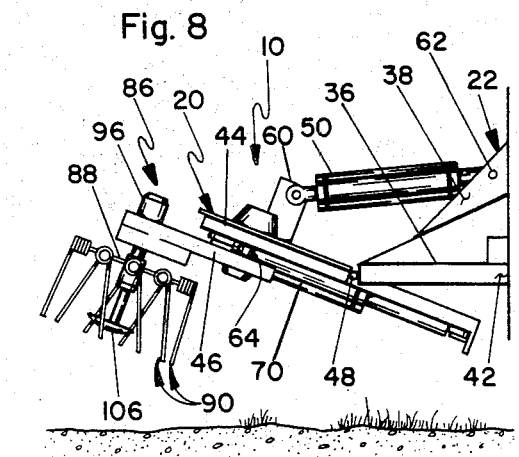

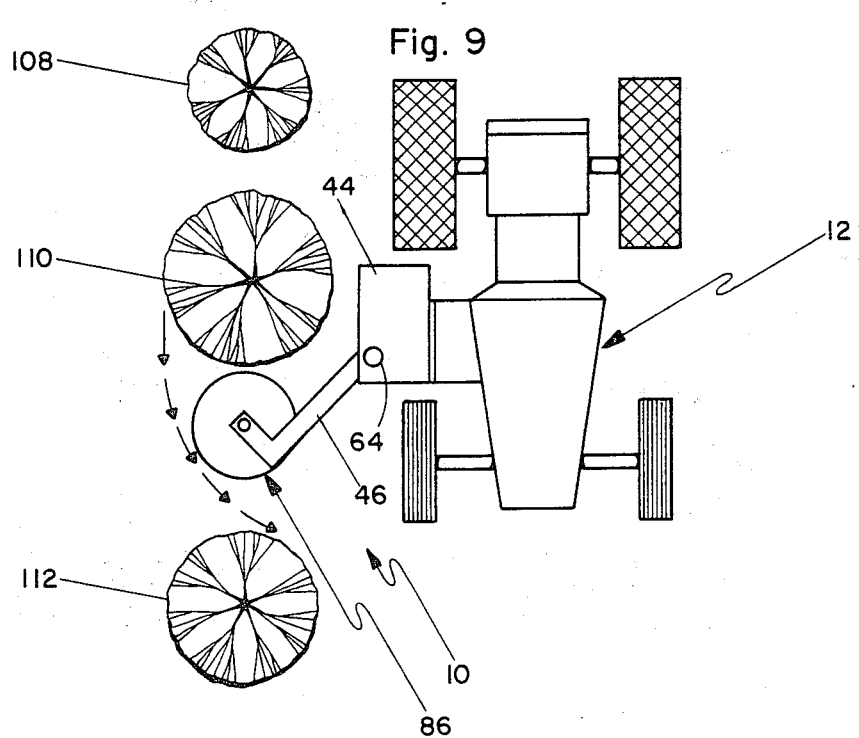
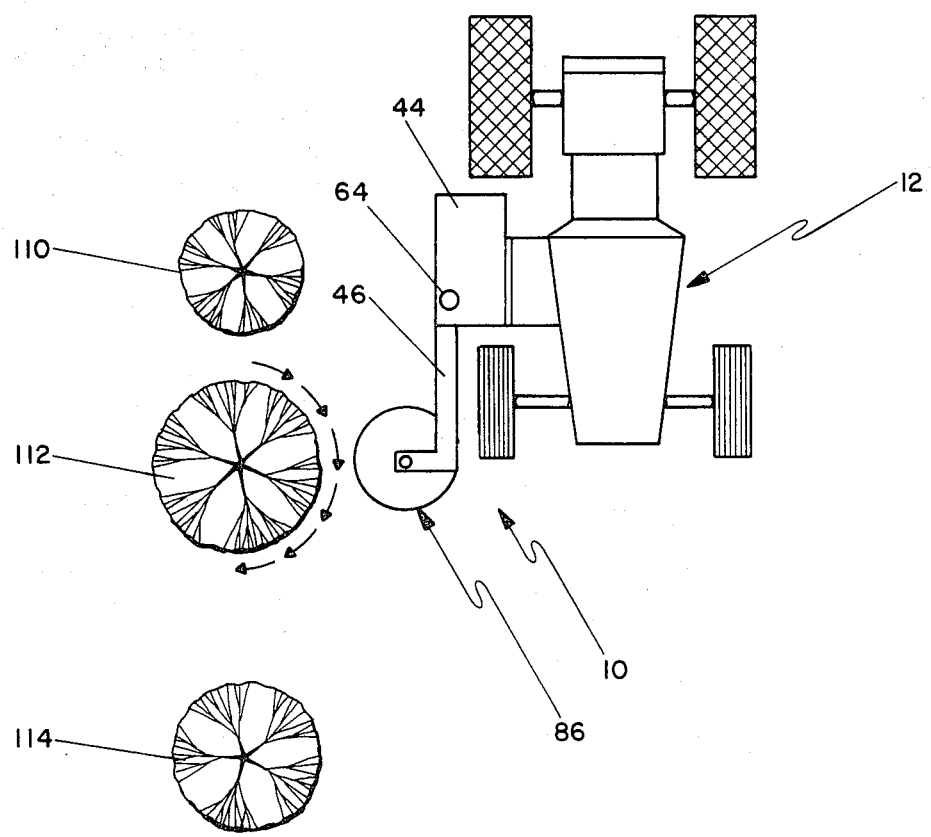

ROTARY TILLER APPARATUS AND PIVOTAL SUPPORT STRUCTURE THEREFOR

BACKGROUND OF THE INVENTION

1. Field of the Invention

The present invention relates to rotary tillers, and in particular, the present invention relates to rotary tillers adapted for tilling between plants planted in a row and other crops difficult to till with conventional drag-type tillers.

2. Description of the Prior Art

Elimination of plants, such as weeds, between and among row crops has been a major problem in agriculture. Typically, for row crops, a drag-type tiller has been used to till the soil and expose the roots of the weeds. However, when the crops in the rows get too high, tillage by drag-type tillers becomes impossible since the frame of the tiller holding the tilling blades will damage the plants. This is particularly true of perennial crops, such as small trees in a nursery, grapevines and various nursery shrubs.

One alternative for tilling such row crops would be manual hoeing. This, however, greatly increases labor costs for maintaining such crops.

There have been various other attempts in the prior art to overcome the problem of tilling the soil between and among row crops. A number of tilling machines having rotary tillers have been devised for mounting on vehicles, such as tractors. The Bezzerides et al U.S. Pat. No. 3,401,753, the Giusti et al U.S. Pat. No. 3,419,086 and the van der Lely U.S. Pat. Nos. 4,043,401 and 4,224,998 show rotary tiller devices which are dragged between rows behind a tractor. The Giusti et al patent further shows a cultivator which is fitted onto a three-point hitch and is movable in an upward and downward direction. However, none of the tiller devices in the immediately above-mentioned patents are capable of tilling the soil between the plants in any one particular row.

The Parks et al U.S. Pat. No. 4,332,299 and the Schenk et al U.S. Pat. No. 4,342,366 show rotary cultivators which are movable in a vertical direction from a non-tilling position to a tilling position. Moving the tiller in a vertical direction from a tilling to a non-tilling position avoids damaging plants when tilling between the plants in a particular row. However, with the above devices the soil between the rows must then be tilled in a separate operation.

The Caggiano, Jr. U.S. Pat. No. 3,117,632 shows a cultivator having a rotary tiller device supported on a frame at a distal end which telescopes in and out among the rows. The device of the Caggiano, Jr. patent includes a highly complicated hydraulic piston arrangement which moves the rotary tiller device in and out of a row of plants.

The Anderson U.S. Pat. No. 4,287,955 is directed to a rotary tiller that pivots about an axis in an upward and downward direction in one embodiment and in another embodiment the rotary tiller is permitted to swivel in a horizontal direction. The tilling apparatus of the Anderson patent does not provide for good control of the tiller in and among the rows and is not suitable for mounting on the side of today's modern tractors.

A commercially available tiller is sold under the trademark "Weed Badger" by Town & Country Research & Development, Inc. of Marion, N.D. The "Weed Badger" tiller is mounted on the end of a support frame having a first member pivotally attached to a bracket on a tractor and a second member pivotally attached to a distal end of the first member. Both members pivot about horizontal axes. The members are moved by a pair of hydraulic cylinders that are synchronized through a common valve which results in a perpendicular movement of the tiller head in and out of the row that is being tilled. The "Weed Badger" tiller also uses a complicated hydraulic scheme in moving the support frame in and out of rows that requires extra cooling capacity in the tractor.

SUMMARY OF THE INVENTION

The present invention includes a rotary tiller apparatus which includes a main support frame having a first member that is pivotal in a generally vertical direction and a second member that is pivotally attached to the first member and pivots in a generally horizontal direction. The first member is pivotally attached to a vehicle, such as a tractor, at a first end and is pivoted in the generally vertical direction preferably by a hydraulic cylinder attached to the first member at one end and to the tractor or a bracket mounted to a tractor at another end. The second member is pivotally attached to the first member and is pivoted in a horizontal plane by a hydraulic cylinder attached to the second member at one end and at another end to the first member. A rotary tiller is attached to the second member at an end opposite from the hydraulic cylinder. The rotary tiller includes a rotatable disk having a plurality of tiller teeth and a hydraulic motor for rotation of the rotatable disk during the tilling operation.

Suitable controls are provided on the tractor for operating the rotary tiller and the two hydraulic cylinders. Each hydraulic cylinder is operated independently of the other providing a simple hydraulic arrangement to operate the tiller apparatus without the need for extra hydraulic fluid cooling.

The tiller device also preferably includes a depth plate mounted below the rotatable disk. The depth plate is positioned to engage the soil and permit the tilling teeth to extend into the soil a predetermined distance.

BRIEF DESCRIPTION OF THE DRAWINGS

FIG. 3 is a bottom schematic view of the rotary tiller apparatus in a sweep position;

FIG. 4 is a bottom schematic view of the rotary tiller apparatus in a retracted position;

FIG. 5 is a front view of the rotary tiller apparatus in a horizontal sweep position;

FIG. 6 is a front view of the rotary tiller apparatus in a horizontal retracted position;

FIG. 7 is a front view of the rotary tiller apparatus in a vertical-inclined sweep position;

FIG. 8 is a front view of the rotary tiller apparatus in a vertical-inclined retracted position;

FIG. 9 is a top plan view of the rotary tiller apparatus tilling between plants in a row; and FIG. 10 is a top plan view of the rotary tiller apparatus mounted on a tractor in the retracted position tilling around a particular plant in the row.

DETAILED DESCRIPTION OF THE PREFERRED EMBODIMENT

Figure 1:
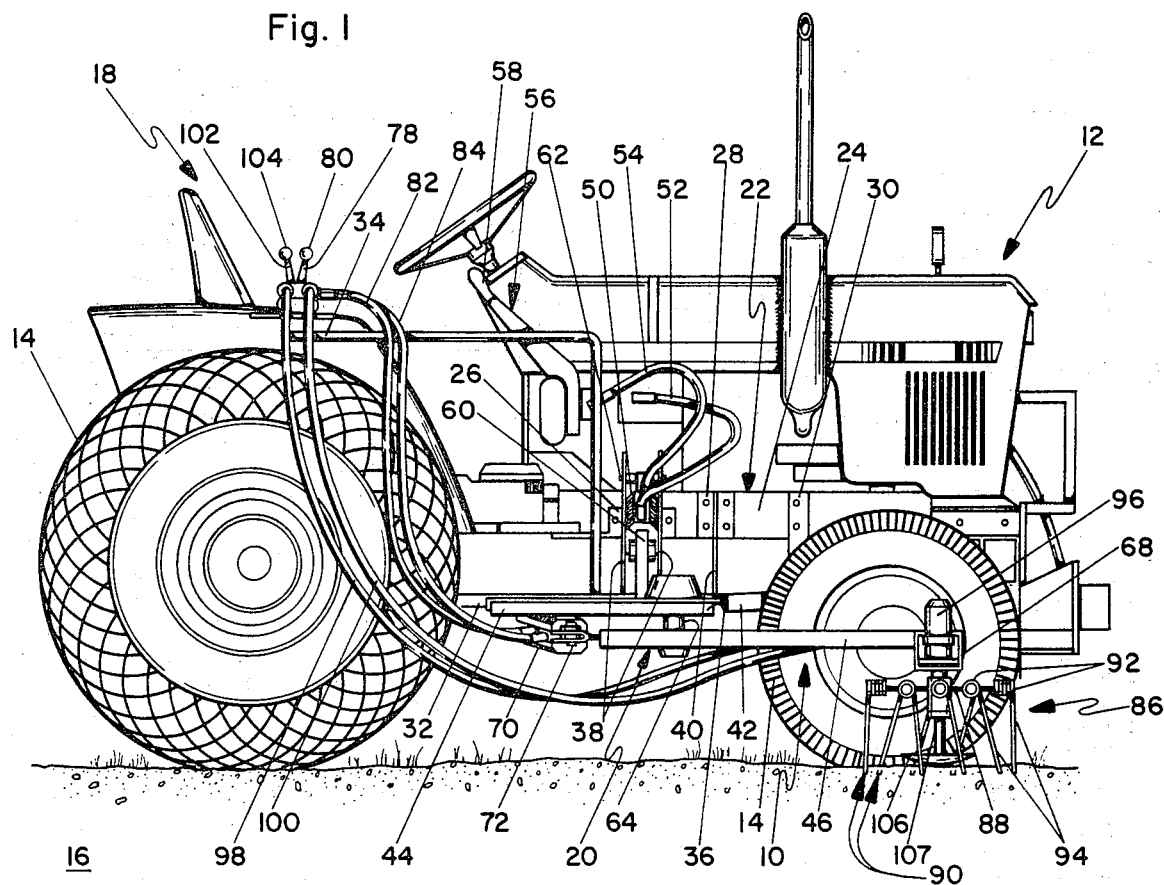
FIG. 1 is a side elevational view of the tiller apparatus of the present invention mounted on a tractor.
Figure 2:
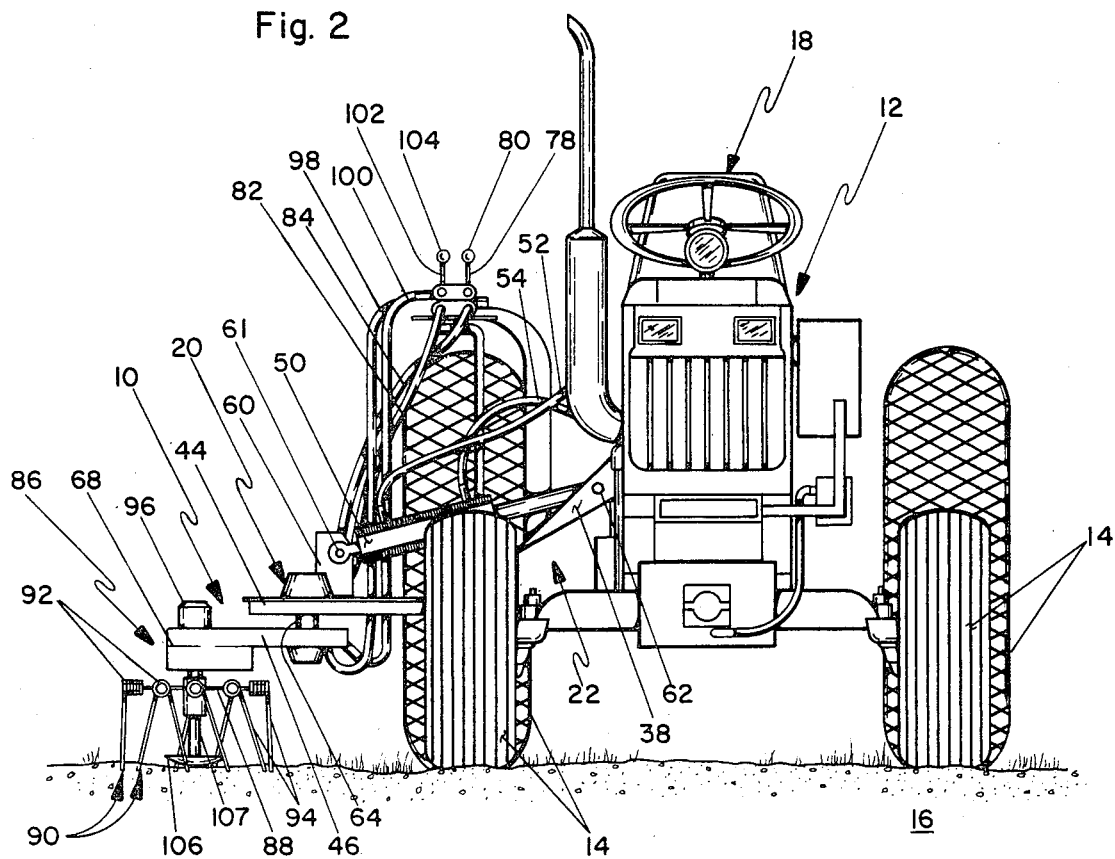
FIG. 2 is a front view of the rotary tiller apparatus mounted on a tractor.

The tiller apparatus of the present invention is generally indicated at 10 in FIGS. 1 and 2. The tiller apparatus 10 is illustrated attached to a tractor 12. The tractor 12 is a conventional-type self-propelled farm tractor having ground-engaging tires 14 that engage the ground or soil 16. The tractor 12 includes an operator compartment 18 from which the operator (not shown) operates the tractor 12 and the tiller apparatus 10 of the present invention. The tractor 12 also includes a conventional hydraulic fluid system that is typically found in agricultural tractors for providing power to operate various implements. Although a particular tractor 12 is shown in specific detail, it should be understood that the tiller apparatus 10 of the present invention is usable with other types of tractors and other similar vehicles that are used in the agricultural field.

The tiller apparatus 10 includes a main support frame 20 which is fixedly attached to the side of the tractor 12 by a suitable bracket 22. The bracket 22 provides rigid support to the main frame 20. The particular configuration of the bracket 22 depends on the particular tractor being used. For example, the tractor illustrated in FIGS. 1 and 2 is a model 750 manufactured by Deere & Co. of Moline, Ill. The bracket 22 is mounted to a tractor frame member 24 by securing flanges 26, 28 and 30 to the frame member 24, as best seen in FIG. 1. In addition, the bracket 22 is further secured to the tractor 12 by rigid bar members 32 and 34.

The rigid bar members 32 and 34 are in turn attached to a main plate 36 of the bracket 22, while flanges 26, 28 and 30 are connected to the main plate 36 by rigid supports 38, 40 and 42, respectively. The particular configuration of the bracket 22 is important to the present invention only in that it provides a rigid support that is mountable to the tractor 12.

The main support frame 20 includes a first support member 44 and a second support member 46. The first support member 44 is preferably a flat plate whose plane is generally perpendicularly disposed to the axis of the tractor 17. The member 44 is pivotally attached to the plate 36 of the bracket 22 by a suitable hinge 48 having a horizontal hinge axis and running along the length of the plate 36. The member 44 and the hinge are perhaps best seen in FIGS. 7 and 8.

The member 44 is pivoted for movement in a vertical plane about the axis of hinge 48 by a double-action hydraulic cylinder 50 which is best seen in FIGS. 1 and 2. The hydraulic cylinder 50 is a conventional cylinder having an internal piston with a piston rod. Hydraulic fluid is fed to the cylinder 50 under pressure from the hydraulic system of the tractor 12. The direction and rate of flow of hydraulic fluid being fed into the cylinder 50 is controlled by a conventional hydraulic valving mechanism 56 that is operated by a lever 58 within reach of the operator, as best seen in FIG. 2.

The hydraulic cylinder 50 is suitably hinged by pin 61 to the member 44, preferably to an upright plate 60 which is welded to the member 44. At its other end, the rod of hydraulic cylinder 50 is disposed between support members 38 and pivotally attached to both support members 38 of bracket 22 by pin 62. When hydraulic fluid is fed to the cylinder 50 through conduit 52, it will be easily understood by those skilled in the art that the member 44 will be retracted from a horizontal position to a vertical inclined position, as will be described subsequently. When the hydraulic fluid is fed under pressure through conduit 54, the member 44 will be moved from the inclined vertical position to a substantially horizontal position, as will also be described subsequently.

The member 46 is pivotally attached to the member 44 about a vertical pivot axis preferably with a Timken taper-roller bearing 64. The bearing 64 is preferably attached to the member 44 at a forward and outward corner, as best illustrated in FIGS. 3 and 4. The bearing 64 is positioned on the member 46 at a predetermined distance from a first end 66 and a second end 68. A double-action hydraulic cylinder 70 similar in construction to cylinder 50, operated independently from the hydraulic cylinder 50, is pivotally attached at the end 66 of the frame member 46 by a suitable pin 72 and its rod end is pivotally attached to the member 44 by a suitable pin 74.

In one working embodiment of the present invention, the distance from the end 66 to the axis of the bearing 64 is ten inches and from the axis of the bearing 64 to the end 68 of the member 46 is thirty inches. The embodiment also includes a double-action hydraulic cylinder 70 with a five inch stroke which results in a fifteen inch sweep of the end 68 of the member 46 during operation, as illustrated in FIG. 3. Although a specific example is given above of the positioning of the bearing 64 from the ends 66 and 68 of the member 46, it will be understood by those skilled in the art that varying the position of the bearing 64 provides a unique arrangement in a tilling apparatus that produces a wide sweep of the end 68 while using a minimum amount of piston stroke.

Hydraulic fluid fed to the cylinder 70 is similarly controlled as described with reference to the hydraulic cylinder 50, as illustrated in FIG. 2. A suitable hydraulic valve 78, operated by a lever 80 positioned within easy reach of the operator, controls hydraulic fluid flowing through hoses 82 and 84. The hoses 82 and 84 transport hydraulic fluid to opposite sides of a piston in the hydraulic cylinder 70.

A rotary tiller 86 is positioned proximate the end 68 of the member 46. The rotary tiller 86 includes a rotatable disk 88 having a plurality of tiller teeth 90 fixedly attached to the disk's outer periphery. The tiller teeth 90 are made of a one-piece spring-type metal having a horizontally disposed coil 92 and a lower ground engaging tine 94. The horizontally positioned coil 92, in contrast to a vertically positioned coil, minimizes breakage of the tines 94 by increasing flexibility of the tines 94 as the tines are rotated during tilling.

A hydraulic motor 96, such as a Char-Lynn Orbit motor made by Char-Lynn Company of Minnesota, is suitably attached to the disk 88 for rotation thereof. The hydraulic motor 68 is driven by hydraulic fluid supplied under pressure from the tractor 12 by supply and return hoses 98 and 100, respectively. The flow of hydraulic fluid to the motor 96 is controlled by a conventional hydraulic valve 102 through an operating lever 104 positioned within reach of the operator of the tractor 12.

The rotary tiller 86 preferably includes a depth plate 106 having a generally concave bottom surface. The depth plate 106 is spaced from the disk 88 by a rod 107 and is positionable at a predetermined distance from the disk 88 so that the tines 94 extend into the soil 16 a predetermined distance. The depth plate is spaced from the disk 88 for the desired depth that the tines are to extend into the ground or soil 16. Through control of the extent in which the tines 94 extend into the ground 16, the depth plate 106 also minimizes breakage of the tines 94 and controls the depth of the tilling operation.

The versatility of the tiller apparatus 10 of the present invention is further illustrated in FIGS. 5 through 8. In FIG. 5, the tiller apparatus 10 is shown in a tilling position wherein the tines 94 extend into the ground 16 for tilling. As discussed previously, the member 44 is pivoted to a horizontal position by controlling the flow of hydraulic fluid to a predetermined side of the piston in the hydraulic cylinder 50. The member 46 is pivoted into a full sweep position to till the ground 16 between the plants in a row by similarly controlling the flow of hydraulic fluid to a predetermined side of the piston in the hydraulic cylinder 70.

When the rotary tiller 86 approaches a particular plant in a row, the operator changes the flow of hydraulic fluid to an opposite side of the piston of the cylinder 70 and the member 46 pivots about the bearing 64 into a retracted position tilling around the plant, as illustrated in FIG. 6.

The tiller apparatus can be lifted from engagement with the ground 16 with the member 46 in either a sweep position or a retracted position as desired by the operator, as illustrated in FIGS. 7 and 8. In FIG. 7, hydraulic fluid to cylinder 70 is controlled so that the member 46 is in a sweep position, as described previously above, and the member 44 is in an inclined vertical position by controlling hydraulic fluid to cylinder 50, as also described previously above. Likewise, as illustrated in FIG. 8, the flow of hydraulic fluid to cylinder 50 is controlled so that the member 44 is in the inclined vertical position and the flow of hydraulic fluid is controlled to cylinder 70 so that the member 46 is in a retracted position.

As further schematically illustrated in FIGS. 9 and 10, the tiller apparatus 10 when used with the tractor 12 tills the soil between plants 108, 110, 112 and 114 which are planted in a row. As seen in FIG. 9, the rotary tiller is specifically tilling the soil between plants 110 and 112. As the tractor 12 and the tiller apparatus 10 approach plant 112, the operator by operating the appropriate hydraulic valve, as previously discussed above, pivots the member 46 and consequently the rotary tiller device 86 to a retracted position, avoiding the plant 112 while tilling the soil around the plant 112, as illustrated in FIG. 10. To place the rotary tiller 86 back into the row after tilling around plant 112, the operator simply operates one hydraulic valve swinging the member 46 pack into a sweep position and rotating the soil between plants 112 and 114.

The present invention provides a rotary tiller apparatus which is simple in construction and operation for the removal of weeds and the like among plants planted in a row. The unique arrangement in which the members 44 and 46 pivot with respect to each other and the use of individually operated hydraulic cylinders eliminates the need for extra cooling in the tractor of the hydraulic fluid and eliminates the synchronization of hydraulic fluid flow to the cylinders as required by some prior art rotary tillers.

Although the present invention has been described with reference to preferred embodiments, workers skilled in the art will recognize that changes may be made in form and detail without departing from the spirit and scope of the invention.

What is claimed is:

1. A rotary tiller apparatus mountable on a vehicle having front and rear wheels and a hydraulic power supply for supplying hydraulic power to the apparatus, the apparatus comprising:

an earth working tool;

a first bracket adapted for side mounting to the vehicle at a location intermediate the front and rear wheels, the bracket including a flat mounting plate forming a generally horizontally oriented plane;

a first support member having first and second ends and pivotally mounted to the mounting plate of the first bracket at the first end along a substantially horizontal pivot axis for pivotal movement between a substantially horizontal work position and an upwardly-inclined retracted position at a first pivot point, the first support member comprised of a flat plate having top and bottom surfaces forming a generally horizontally oriented plane;

a second bracket mounted to and extending upwardly from the top surface of the first support member;

a second support member having a first and second end and pivotally attached along a substantially vertical axis to the first support member at a second pivot point positioned between the first and second ends of the second support member, the first end of the second support member being mounted underneath the bottom surface of first support member, and the earth working tool being mounted proximate the second end of the second support member for pivotal motion about a substantially horizontal plane when the first support member is in the horizontal work position;

first pivot means for pivotally connecting the first support member to the mounting plate of the first bracket at the first pivot point;

second pivot means for pivotally connecting the second support member to the first support member at the second pivot point;

a first hydraulic cylinder, first conduit means for transporting hydraulic fluid from the vehicle to the cylinder and back to the vehicle and first valve means for controlling the flow of hydraulic fluid, the first hydraulic cylinder having a first and a second end and being pivotally attached to the first bracket at the first end and to the second bracket at the second end so that the first member pivots between the work position and the retracted position; and a second hydraulic cylinder, second conduit means for transporting hydraulic fluid from the vehicle to the cylinder and back to the vehicle and second valve means for controlling the flow of hydraulic fluid independently from the first valve means, the second hydraulic cylinder being mounted underneath the bottom surface of the first support member and having a first and a second end, the second hydraulic cylinder being pivotally attached at the first end to the first end of the second support member and being pivotally attached at the second end to the first support member for driving the earth-working tool about the substantially horizontal plane in a sweep motion between an extended position and a retracted position adjacent to the vehicle.

2. The apparatus of claim 1 wherein the pivot location on the second support member is located approximately twice the distance from the earth working tool than from the first end of the second hydraulic cylinder.

3. The apparatus of claim 1 wherein the earth working tool includes a rotatable disc, a plurality of tiller teeth attached to the disc, and means for rotating the disc and the teeth.

4. The apparatus of claim 3 and further including means for controlling the extent that the tiller teeth extend into soil.

5. The apparatus of claim 4 wherein the means for controlling the depth includes a plate and means for adjusting the position of the plate with respect to the tiller teeth.

6. The apparatus of claim 5 wherein the plate has a substantially curved bottom surface.

* * * * *